United States Patent
Thyagarajan et al.

(10) Patent No.: US 12,433,299 B2
(45) Date of Patent: Oct. 7, 2025

(54) SYSTEM AND METHOD FOR METAMATERIAL ARRAY-BASED FIELD-SHAPING

(71) Applicant: XEROX CORPORATION, Norwalk, CT (US)

(72) Inventors: Krishnan Thyagarajan, Sunnyvale, CA (US); Christopher Somogyi, Wimberley, TX (US)

(73) Assignee: XEROX CORPORATION, Norwalk, CT (US)

( * ) Notice: Subject to any disclaimer, the term of this patent is extended or adjusted under 35 U.S.C. 154(b) by 631 days.

(21) Appl. No.: 17/875,959

(22) Filed: Jul. 28, 2022

(65) Prior Publication Data

US 2024/0036404 A1 Feb. 1, 2024

(51) Int. Cl.
*A23B 2/60* (2025.01)
*A23B 2/50* (2025.01)
(Continued)

(52) U.S. Cl.
CPC .................. *A23B 2/60* (2025.01); *A23B 2/50* (2025.01); *B01J 19/087* (2013.01);
(Continued)

(58) Field of Classification Search
CPC .................. B01J 19/087; B01J 19/0013; B01J 19/0033; B01J 2219/00193; B01J 2219/00227;
(Continued)

(56) References Cited

U.S. PATENT DOCUMENTS

| 2,438,582 A | 3/1948 | Southerwick |
|---|---|---|
| 7,237,400 B2 | 7/2007 | Owada |

(Continued)

FOREIGN PATENT DOCUMENTS

| CN | 108865881 | 11/2018 |
|---|---|---|
| CN | 110906627 | 3/2020 |

(Continued)

OTHER PUBLICATIONS

Laura Otero et al. "Effects of Magnetic Fields on Freezing: Application to Biological Products: Magnetic freezing of biological products?", Comprehensive Reviews in Food Science and Food Safety; vol. 15, No. 3, May 1, 2016 (May 1, 2016), pp. 646-667, XP055495395, US ISSN: 1541-4337, DOI: 10.1111/1541-4337. 12202, p. 643, left-hand column.

(Continued)

*Primary Examiner* — Lessanework Seifu
(74) *Attorney, Agent, or Firm* — Leonid Kisselev (57) ABSTRACT

A feedback system that identifies characteristics of an object and utilizes the characteristics to initiate and adjust a field applied to the object is provided. The system includes an array of array phase elements made of metamaterials that allow precise shaping of the field to be applied to a particular portion of an object based on characteristics of the object, including location and thickness of the object. Sensors are utilized during supercooling to monitor a condition of the object being supercooled. Specifically, characteristics of the object are measured at different points, areas, or volumes on the object and the measurements are used to determine whether supercooling (or another desired result) is being achieved or whether the object is starting to freeze. Based on the measurements, parameters of the field can be adjusted to ensure supercooling of the object without freezing.

20 Claims, 7 Drawing Sheets

(51) Int. Cl.
*B01J 19/08* (2006.01)
*G02F 1/1343* (2006.01)

(52) U.S. Cl.
CPC .... *G02F 1/134309* (2013.01); *G02F 1/13439* (2013.01); *G02F 2202/30* (2013.01)

(58) Field of Classification Search
CPC .... B01J 2219/00245; A23B 2/50; A23B 2/60; A23B 4/015; A01N 1/162; A01N 1/168; C12N 5/562
See application file for complete search history.

(56) References Cited

U.S. PATENT DOCUMENTS

| | | | |
|---|---|---|---|
| 8,464,544 | B2 | 6/2013 | Shin et al. |
| 10,588,336 | B2 | 3/2020 | Jun et al. |
| 2002/0005043 | A1 | 1/2002 | Rudick et al. |
| 2007/0163275 | A1 | 7/2007 | Ha et al. |
| 2007/0163289 | A1 | 7/2007 | Hahm et al. |
| 2007/0196543 | A1 | 8/2007 | Lee et al. |
| 2008/0053124 | A1 | 3/2008 | Cho et al. |
| 2008/0245079 | A1 | 10/2008 | Lim et al. |
| 2008/0245081 | A1 | 10/2008 | Shin et al. |
| 2011/0165553 | A1 | 7/2011 | Elliott et al. |
| 2013/0202752 | A1 | 8/2013 | Tao |
| 2015/0118369 | A1 | 4/2015 | Hyde et al. |
| 2015/0233631 | A1 | 8/2015 | Shuntich |
| 2015/0264968 | A1 | 9/2015 | Shuntich |
| 2017/0181455 | A1 | 6/2017 | Bullo et al. |
| 2018/0045458 | A1 | 2/2018 | Shuntich |
| 2018/0149422 | A1 | 5/2018 | Spivey et al. |
| 2018/0180353 | A1 | 6/2018 | Shuntich |
| 2019/0126203 | A1 | 5/2019 | Biegelsen et al. |
| 2020/0056819 | A1 | 2/2020 | Inada et al. |
| 2020/0312078 | A1 | 10/2020 | Deshpande et al. |
| 2020/0323246 | A1 | 10/2020 | Jacobs et al. |
| 2021/0131718 | A1 | 5/2021 | Jeong et al. |
| 2021/0161182 | A1 | 6/2021 | Stoenescu et al. |
| 2021/0403854 | A1 | 12/2021 | Koren et al. |
| 2022/0003493 | A1 | 1/2022 | Park et al. |
| 2022/0118136 | A1 | 4/2022 | Church et al. |
| 2022/0211278 | A1 | 7/2022 | Dede et al. |

FOREIGN PATENT DOCUMENTS

| | | |
|---|---|---|
| CN | 110953797 | 4/2020 |
| CN | 214593076 | 11/2021 |
| EP | 0765606 | 4/1997 |
| EP | 0584127 | 12/1997 |
| EP | 1980809 | 10/2008 |
| EP | 2499924 | 9/2012 |
| GB | 2476834 | 7/2011 |
| IN | 110462314 | 11/2019 |
| JP | 2005291525 | 10/2005 |
| JP | 2009030961 | 2/2009 |
| KR | 20080003136 | 1/2008 |
| KR | 20080088943 | 10/2008 |
| KR | 20180054120 | 5/2018 |
| KR | 20220043324 | 4/2022 |
| WO | 2006100740 | 9/2006 |
| WO | 2008004761 | 1/2008 |
| WO | 2008004765 | 1/2008 |
| WO | 2008150104 | 12/2008 |
| WO | 2008153285 | 12/2008 |
| WO | 2015089112 | 6/2015 |
| WO | 2018187840 | 10/2018 |
| WO | 2020023747 | 1/2020 |
| WO | 2020138148 | 7/2020 |
| WO | 20210146122 | 7/2021 |

OTHER PUBLICATIONS

Pirouzian Haniyeh Rasouli et al: "Pre-crystallization process in chocolate: Mechanism, importance and novel aspects", Food Chemistry, Elsevier Ltd, NL, vol. 321, Apr. 1, 2020 (Apr. 1, 2020), XP086133616, ISSN: 0308-8146, DOI: 10.1016/J.FOODCHEM.2020.126718 [retrieved on Apr. 1, 2020].

SYSTEM AND METHOD FOR METAMATERIAL ARRAY-BASED FIELD-SHAPING

FIELD

This application relates in general to temperature control and in particular, to a system and method for metamaterial array-based field-shaping.

BACKGROUND

Freezing is commonly used to preserve and store food and other organic material. Freezing involves keeping an object at sub-zero temperatures to minimize microbial damage of that object. However, during the process of freezing, unwanted chemical composition changes, nutritional damage and physical damage can occur in the object. Freezing is also time consuming and can be restricted to particular organic object, rendering the process unavailable for some oil-based foods and objects with low water content. Furthermore, when the object is to be subsequently consumed, a thawing time needs to be accounted for before the object can be utilized. On the other hand, refrigeration reduces physical degradation, but induces rapid microbial and nutritional damages, thereby rendering refrigeration ineffective for long-term storage.

The restrictions of freezing, including freeze drying, and refrigeration for preservation can both be overcome by supercooling, while permitting the advantages of both techniques to be present. Currently used supercooling techniques utilize fields, such as magnetic and electromagnetic fields, as described in U.S. Pat. No. 10,588,336, to Jun, to help preserve the physical, nutritional, and sensory characteristics of an object, such as a biological item, while subjecting the object to a temperature below the freezing point of water without freezing the object itself. This is enabled by the suppression or prevention of phase change of both intracellular and intercellular water in the intended object. The fields can include a pulsed/oscillating electric field, pulsed/oscillating magnetic field, or a combination of fields to reorient and induce vibration of water molecules in the object (among other physico-chemical controls), thus suppressing or preventing the formation of ice from the water molecules.

While applicable to many kinds of objects, supercooling is of a particular interest in preserving biological items, such as food, organs, produce, tissues, stem cells, embryos, vaccines, water-based medicines, and blood, with achieving and maintaining a supercooled state of the biological item being possible due to oscillating/pulsed magnetic fields or oscillating/pulsed electric fields or a combination thereof, which prevents nucleation or freezing of the water contained in the biological item. However, conventional techniques for supercooling do not account for differences in the biological items' characteristics and do not allow for a near-real-time assessment of the status of the supercooled object to provide a closed-loop feedback, thus complicating achieving a desired result. In particular, achieving a state of supercooling requires an approach tailored to individual characteristics of the objects being supercooled. For instance, based on the composition of a specific object, different field characteristics such as field strength, frequency, phase, and waveform, are necessary. Determining the correct characteristics and their values in order to achieve supercooling and prevent ice-nucleation can be difficult to determine due to many factors, including size, shape, and content of the object, and many of the general public may experience difficulty in maintaining supercooling conditions based on a lack of knowledge of object composition and lack of monitoring capabilities. In addition, the fields that were appropriate previously, may no longer be suitable for continuing the supercooling process.

Further, when electromagnetic fields are applied for supercooling or trying to change of an object in other ways, the electromagnetic fields fall off as the inverse squared/cubed of the distance from the source, thereby making certain regions of the object to which the field is being applied difficult to access. Thus, if an object is being supercooled is a watermelon, the field that reaches the center of the watermelon may be different than the field that reaches the rind of the watermelon. The delivery of an appropriate field is further complicated in case of an object that is not only has a considerable thickness, but also is composed of multiple layers with different characteristics, such as in a case of a cheeseburger that has layers of meat, bread, cheese, vegetables, as well as various toppings. Similarly, if the field is being applied to multiple objects simultaneously, the objects at different distances from the source of the field are not exposed to the field to the same degree, which can result in the two objects not being affected by the field in the same way.

Accordingly, a feedback device to monitor the object and adjust parameters of the field to reach and maintain supercooling without freezing of the object is needed. Preferably, the feedback device tailors the field applied to achieve supercooling based on characteristics of the object being supercooled, as the ability to change the supercooling characteristics on the fly is important to obtain optimum energy-efficient supercooling. There is a further need for a way to control the parameters of the field that reach particular portions of the object to which the field is applied regardless of the position of the object.

SUMMARY

A feedback system that identifies characteristics of an object and utilizes the characteristics to initiate and adjust a field applied to the object is provided. The system includes an array of array phase elements made of metamaterials that allow precise shaping of the field to be applied to a particular portion of an object based on characteristics of the object, including location and thickness of the object. In one embodiment, the system leverages machine learning to automatically identify a condition of the object and adjust the supercooling parameters. Sensors are utilized during supercooling to monitor a condition of the object being supercooled. Specifically, characteristics of the object are measured at different points, areas, or volumes on the object and the measurements are used to determine whether supercooling (or another desired result) is being achieved or whether the object is starting to freeze. Based on the measurements, parameters of the field can be adjusted to ensure supercooling of the object without freezing.

In one embodiment, a device for metamaterial array-based field-shaping is provided. The device includes a compartment sized to hold at least one object; an array of phase array elements, each of the phase array elements comprising a metamaterial and configured to generate a plurality of waveform components; one or more sensors configured to determine characteristics associated with the object at one or more spatial locations at multiple time points; and a controller configured to determine parameters based on the characteristics determined at the multiple time points and to control application of at least one field comprising one or more of the waveform components at the at least one object by at least a portion of the phase array elements based on the parameters by individually controlling at least the portion of the phase array elements generating the one or more waveform components comprised in the field.

In a further embodiment, a system for metamaterial array-based field-shaping is provided. The system includes a compartment sized to hold at least one object; an array of phase array elements, each of the phase array elements comprising a metamaterial and configured to generate a plurality of waveform components; one or more sensors configured to determine characteristics associated with the object at one or more spatial locations at multiple time points; and a controller configured to determine parameters based on the characteristics determined at the multiple time points; and a further controller configured to control application of at least one field comprising one or more of the waveform components at the at least one object by at least a portion of the phase array elements based on the parameters by individually controlling at least the portion of the phase array elements generating the one or more waveform components comprised in the field.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Food is often frozen or freeze dried to ensure preservation for long periods of time, while maintaining nutrients. However, during the freezing or freeze drying processes, chemical agents may be introduced and food may undergo chemical compositional changes. Further, freezing, including freeze drying, is not appropriate or effective for all types of objects. In lieu of freezing or freeze drying, supercooling can be applied to food and other water-containing objects, such as organic matter and biological items. During supercooling, the water-containing objects are preserved by cooling the objects to a temperature below the freezing point of water without initiating the formation of ice within or on the object. However, ensuring that the water in the object does not freeze, by turning to ice, can be difficult and the object should be monitored closely. A feedback device can monitor characteristics or conditions of an object under supercooling conditions, determine new parameters for the supercooling fields applied, and make adjustments to the fields based on the new parameters. Further, by utilizing an array of phase array elements that include metamaterials and that are individually controlled, the parameters of the field directed at a particular portion of the object can be shaped specifically to characteristics of that portion of the object as well as the position of the object within the device that applies the field.

Figure 1:
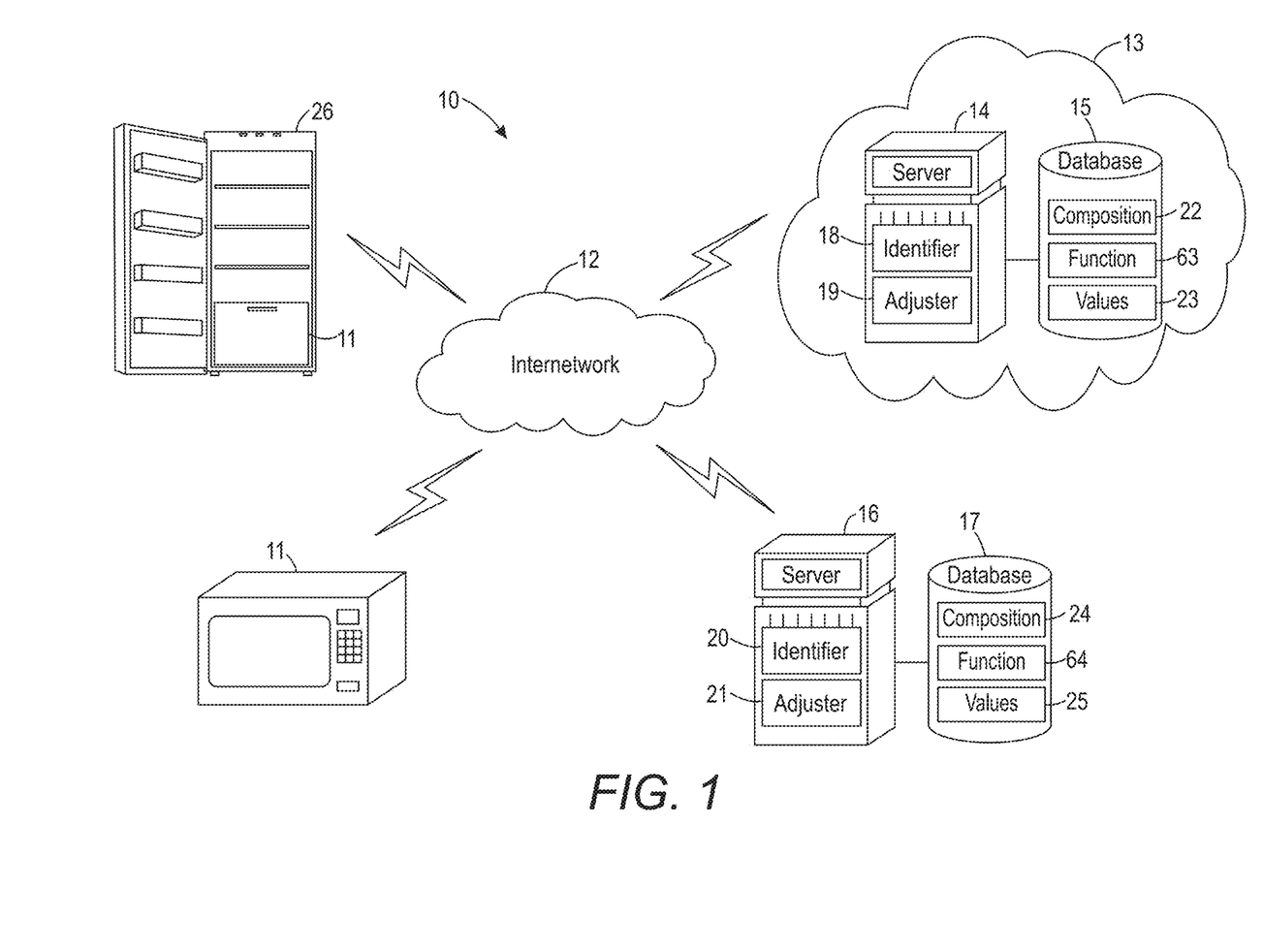
FIG. 1 is a block diagram showing, by way of example, a system for metamaterial array-based field-shaping.

Utilizing a feedback device during supercooling helps prevent nucleation of water in an object in a much more optimum manner. FIG. 1 is a block diagram showing a system 10 for metamaterial array-based field-shaping, in accordance with one embodiment. A supercooling device 11 can supercool an object to a temperature below the freezing point of water without freezing the object by applying one or more fields to the object, including magnetic, electric, and electromagnetic fields. The supercooling device 11 can be a standalone device or can be incorporated into an appliance, such as a refrigerator or another freezer 26, and is described in detail below with respect to FIGS. 4 and 5.

The supercooling device 11 communicates with a feedback server 14, 16 via an internetwork 12, such as the Internet or cellular network, to obtain and adjust characteristics of the field based on the obtained characteristics. In one embodiment, the feedback server 14 can be a cloud-based server. Alternatively, the server 16 can be locally or remotely located with respect to the supercooling device 11. The feedback server 14, 16 can include an identifier 18, 20 and an adjuster 19, 21. The identifier 18, 20 can utilize measurements for characteristics of the object obtained from the supercooling device 11 to determine an identity or classification of the object based on known composition values 22, 24 of objects stored in a database 15, 17 associated with the server 14, 16. Machine learning can also be used in lieu of or in addition to a look up table of compositions and identities or classifications. In a further embodiment, identification or classification of an object can occur on the supercooling device 11, such as via a processor, which is described in detail below with respect to FIG. 6.

Additionally, as the device 11 can apply the fields for multiple purposes, a user can optionally specify the desired result of the application of the fields as a function 63, 64 of the device 11. The adjuster 19, 21 can utilize the function 63, 64 selected by for generation of the parameters. In particular, the function 63, 64 can specify whether the colloid 62 is to be supercooled to a below-freezing temperature without freezing (or otherwise changing phase) or whether the fields are to be applied for another purpose, such as promoting a growth of a group of cells, as described in commonly-assigned U.S. patent application, entitled "System and Method for Controlling Cell Functioning and Motility with the Aid of a Digital Computer," Ser. No. 17/876,065, filed Jul. 28, 2022, pending, the disclosure of which is incorporated by reference, or cause a detachment of a group of cells from a surface on which they are grown. If goals of application are different for different parts of the object (such as if some cells in an artificially-grown piece of meat are to be detached from a surface earlier than other cells), the function 63, 64 can specify such goals. Still other kinds of functions 63, 64 are possible. The function 63, 64 can be entered by the user through the user interface of the device 11 and then wirelessly provided to the adjuster 19, 21, or can be provided to the adjuster 11 through a further computing device, such as a mobile phone or a personal computer interfaced to the adjuster 19, 21 through the Internetwork 12.

The adjuster 19, 21 utilizes data obtained from the supercooling device 11 regarding the object and the field to determine whether the field should be adjusted to ensure an appropriate supercooling temperature is reached, without allowing nucleation of ice via the water content in the object. The adjustment can be determined using characteristic values 23, 25 for the object and parameter values for the field, which are stored by the databases 15, 17 to determine new parameter values for the field. In a further embodiment, ranges of object characteristics and field parameters can be stored on the supercooling device 11 for use in adjusting the supercooling fields applied to an object. Alternatively, machine learning can also be used to determine and adjust field parameters in lieu of a stored look up table of characteristic values and parameters.

Figure 2:
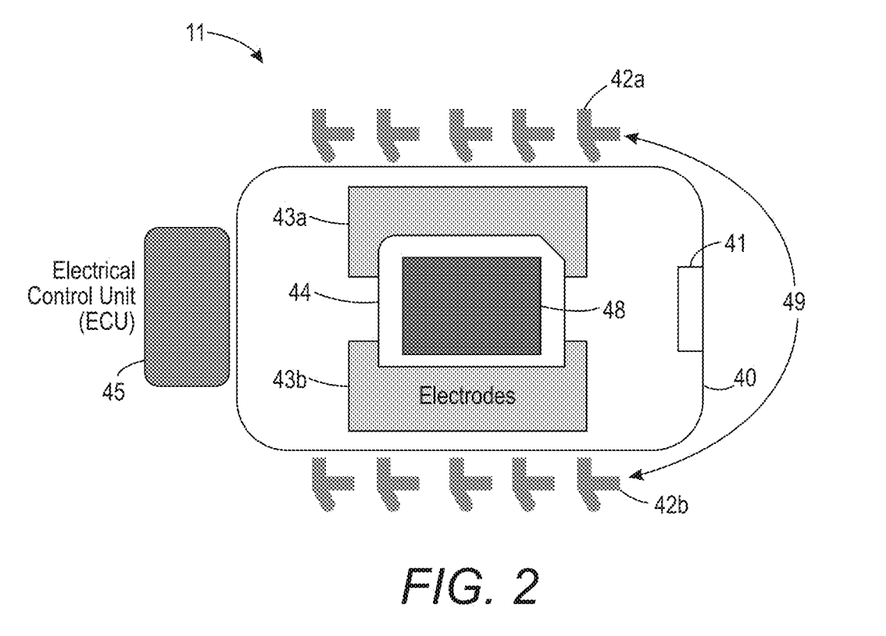
FIG. 2 is a block diagram showing a device for metamaterial array-based field-shaping, in accordance with one embodiment.

To determine initial and updated field parameters, the feedback device utilizes one or more sensors. FIG. 2 is a block diagram showing, by way of example a device for metamaterial array-based field-shaping, in accordance with one embodiment. While in the description below, the device 11 is referred to as a supercooling device 11, as also described below, the field applied by the device 11 can be used for other purposes. The supercooling device 11 can include a receptacle 40 in which an object 44 is placed to undergo supercooling. The receptacle 40 can include a container, pan, or other type of receptacle for holding the object 44. In one embodiment, the receptacle 40 is placed into a standalone housing (not shown) to initiate supercooling as described in FIG. 5 or alternatively, can be incorporated into an appliance, such as a refrigerator or microwave, such as described below in detail with respect to FIG. 4.

Figure 7:
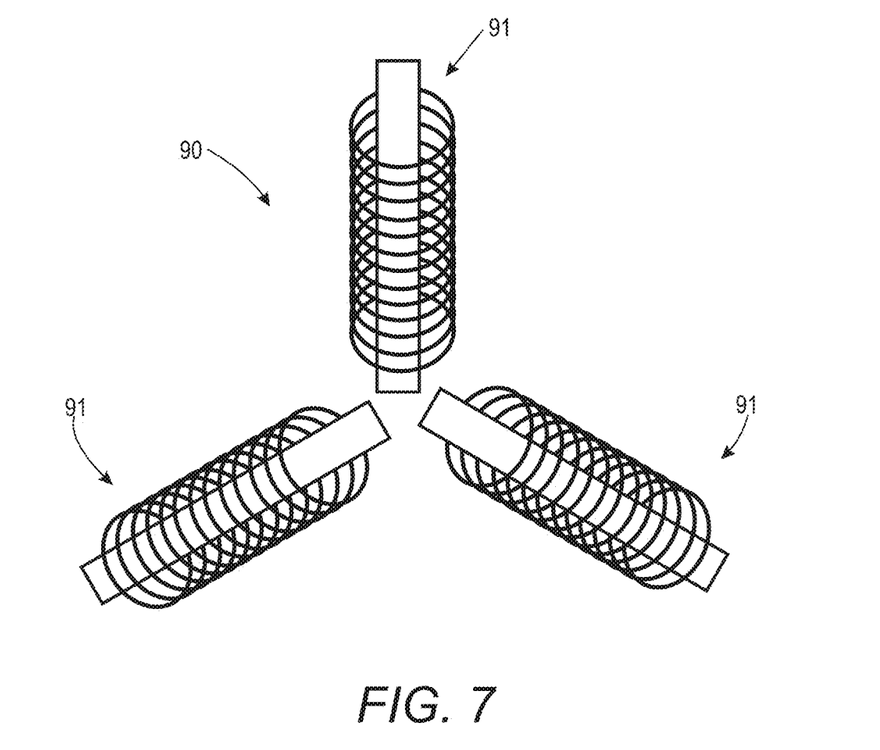
FIG. 7 is a diagram showing a motif including three sub-motifs that are coils along three perpendicular axis in accordance with one embodiment.

The fields generated by the device 11 are composed of multiple waveforms that together define that field's parameters. Each waveform is in turn composed of multiple components (such as Fourier components), with the phase, amplitude, frequency, and power of the components defining the overall parameters of the waveform. The structure of the device allows to generate the components (such as Fourier components) with desired parameters and direct them to them to a desired location to define desired fields at the locations. In particular, the device 11 includes a plurality of phase array elements 42 *a,b*, which can be positioned on opposite sides with respect to the receptacle 40. Together, the array elements 42*a,b* form an array 49 that allows to perform field-shaping (directing the field with particular parameters towards portions of the receptacle 40 in which portions of the object 46 to which the field with those parameters needs to be applied are located) through actuating of specific arrays as well as through manipulating magnetic permeability and dielectric permittivity (including via active electromagnetic control over the properties of the elements constituting the metamaterial including, but not limited to, electrical conductivity, phase change dielectrics, field-effect controls, composite fill-fraction control, applying external bias to 2D van der Waals materials) of components that make up that phase array element 42*a,b*. Each array element 42 *a, b* can be made of one or more metamaterials, with a metamaterial being an active or passive material whose electromagnetic properties can be manipulated in a way such that at least one of the response of the material properties or the electromagnetic interaction with matter is modified in a manner not found in naturally occurring materials or material systems. The metamaterials can include electromagnetic coils placed in certain arrangements with certain currents driven through the coils in engineered phases, change in electromagnetic properties by the inclusion of materials with properties as described above and that can be modulated via external signals such as electrical currents, voltages, temperature (though other external signals are possible). In addition or alternatively to electromagnetic coils, metamaterials can include composite materials with layers of combinations of metals (such as silver, gold, platinum, copper, tungsten, though other composite materials are also possible) and dielectrics (such as hafnium oxide, aluminium oxide, silicon dioxide, transparent conducting oxides). Due to being made of metamaterials, the array elements include components that are much smaller than the wavelength of the electromagnetic energy under consideration (ranging from microns to centimeters in dimensions). In particular, each array element includes one or more electromagnetic motifs, such as coils and loops, though other motifs are also possible. In one embodiment, each of the motifs further includes three sub-motifs aligned to produce electromagnetic fields in three different directions and axes, with each sub-motif being able to generate a component of the waveform, such as a Fourier component. For example, a combination of three coils along three perpendicular axis is a motif and each coil in the combination is a sub-motif, as shown with reference to FIG. 7. FIG. 7 is a diagram showing a motif 90 including three sub-motifs 91 that are coils along three perpendicular axis in accordance with one embodiment. In a further embodiment, other numbers of sub-motifs in a single motif and other types of sub-motifs are also possible.

If the metamaterials include smart materials such as _ magnetic polymers, conducting organic polymers, phase-change materials, _materials that can modulate their properties based on an external signal such as electric field, magnetic field, voltage, current, temperature (though other smart materials may still be possible), the motifs formed by these materials could be triggered to change on demand based on application of external signals (described above) to these motifs. The motifs could be two-dimensional or three-dimensional. The three-dimensional motifs in three-dimensional array elements 42*a,b* provide more degrees of freedom than 2-dimensional motifs, resulting in greater control over the generated fields. Further, the three-dimensional motifs can carry lower current compared to two-dimensional motifs and greater reduction in currents can be achieved using high-permeability (such as soft iron) materials within the motifs as cores, enhancing the ability to control the spreading of the fields. The array elements 42*a,b* can each include at least one magnet such as an electromagnet, a permanent magnet, or a combination of magnets, with the created field being an oscillating magnetic, electric or electromagnetic field for application to the object. Time-varying magnetic fields can be used to create electric fields and vice-versa. In a further embodiment, the phase array elements can be remotely located from the receptacle 40 and the field emitted from the array elements 42*a,b* can be applied to the object 44 via one or more transducers. Additional flexibility in how the field can be shaped can be obtained through physically moving the array elements 42*a,b* to desired positions, either automatically (under the control of the controller 45) or manually.

The electronic control unit 45, described in more detail below, can individually control each sub-motif in an array element 42 *a,b*, thus allowing each sub-motif to produce a component of a waveform with desired parameters. In particular, a set of conductors couple the sub-motifs of each of the motifs in each of the array elements to one or more input signals such that each of the sub-motifs is independently activated via an individually selectable current applied through the conductor that is interfaced to that sub-motif. The individual activation creates a resultant field that is a combination of the magnetic and electric fields in three different axes for each of the motifs. By selecting a particular sub-motifs of particular array elements 42*a,b*, and providing current to those sub-motifs, the electromagnetic field distribution can be controlled and tuned to precisely impinge a pre-determined amount of energy and power in a pre-determined spatiotemporal distribution. The electromagnetic energy may be used to target a single region, such as a particular portion of an object 44, or simultaneous multiple regions of one object 44 or of multiple objects 44 within the device.

In a further embodiment, in addition to or alternatively to individually actuating the sub-motifs, each array can generate frequencies of the electromagnetic waves that are outside a range of frequencies that may directly capable of being produced by the sub-motifs individually. Intersection of the electromagnetic waves in each target region can creates envelope-modulated electric and magnetic fields having one or more frequencies that fall within the range of frequencies that controls the phase transition and that could not be individually produced by the sub-motifs, thus widening the kinds of fields that can be applied to the object 44

In a still further embodiment, in addition to or alternatively to the individually-controlled sub-motifs and the use of frequencies creating envelope-modulated fields, the device 11 can further use susceptors additional fine control over the local electromagnetic fields. The susceptors can be implemented as a mesh 48 that is at least partially formed of metal or other conductive materials. The mesh formation 48 is positioned over a portion of the object 44 to which a particular kind of field needs to be applied to achieve a desired effect. In one embodiment, different portions of the mesh 48 can be insulated from each other, with each particular portion interfaced to one or more array elements 42 *a,b*, and being able to transmit the waveforms from the array elements to the desired portions of the object 44. In a further embodiment, the device 11 could include multiple spatially-separated meshes 48, each interfaced to one or more of the array generators 48, with the individual meshes 48 being movable to cover portions of the objects 48 to which a particular field needs to be applied. In a still further embodiment, instead of being interfaced to the array elements 42*a,b*, the one or more meshes 48 could receive input electric current necessary for generation of the required field under a control of the control unit 45 in other ways. Each mesh 48 could include repeating patterns, including cartersian, hexagonal, rhombic, though other kinds of repeating patterns and other other structures of the mesh 48 are also possible.

The array elements 42*a,b* can each include a magnet, electrode, wires, electromagnets, or other material systems, such as 2D materials, including for example, graphene, van-der-waals layered materials or organic conductive polymers. At a minimum, the array generators should each be able to apply a field to an object 44 placed on or within the receptacle 40 to control nucleation, including preventing nucleation from occurring, via the field, or cause other desired changes in the objects, as described in commonly-assigned U.S. patent application, entitled "System and Method for Controlling Cell Functioning and Motility with the Aid of a Digital Computer," Ser. No. 17/876,065, filed Jul. 28, 2022, pending, and commonly-assigned U.S. patent application, entitled "System and Method for Controlling Cellular Adhesion with the Aid of a Digital Computer," Ser. No. 17/876,072, filed Jul. 28, 2022, pending, the disclosures of which are incorporated by reference. Initial values for parameters of the fields to be applied can be determined based on an identity or classification of the object 44 (or objects 44), which can be determined automatically or provided by a user, as further described below with respect to FIG. 6. In addition, the parameters can be based on positions of the object 44 (or objects 44) within the receptacle 40. Further values of the parameters are based on monitored characteristics of the object to which the fields are applied, also described below in detail with respect to FIG. 6.

In addition to the array 49, the device 11 can further include one or more electrodes 43 *a,b* can be positioned on a bottom side of the receptacle, along an interior surface, to generate a pulsed electric field if one is necessary to achieve a desired result such as supercooling. Other positions of the electrodes are possible, including on opposite sides (not shown) of the receptacle 40. When placed in a position other than the bottom of the receptacle, the electrodes can be affixed to walls of the standalone housing or walls of a housing, such as an appliance. The electrodes can be positioned to contact the object or in a further embodiment, can be placed remotely from the object. In one embodiment, a pair of electrodes can be positioned across from one another, with the object between the pair of electrodes. Once positioned, the electrodes can provide an electric field to the object.

Further, at least one closed-loop monitoring sensor 41 can be provided adjacent to the receptacle on one or more sides. Alternatively or in addition, a sensor can be affixed to the housing, on an interior surface, in which the receptacle is placed for supercooling. The monitoring sensors can include imaging and reflective sensors, electrocurrent sensors, chemical sensors, electric sensors, acoustic sensors, optical sensors (including video sensors that can be used to determine a location of an object 44 within the device 11), electrochemical sensors, thermal sensors and imagers, and hyperspectral sensors. However, other types of sensors are possible. Data collected via the sensors can be used to monitor characteristics of the object during application of the fields and change the values of the field parameters, as part of a feedback process to control nucleation during supercooling, or other purposes for which the field needs to be applied.

An electrical control unit 45 can be a processor that is interfaced to the sensors 41, phase array elements 42 *a,b*, and electrodes 43 *a,b* to communicate during the feedback process. Specifically, the processor can determine an identity of or classify an object for supercooling (or field application for other purposes) based on measurements from the sensors 41, as well as identify parameters for the field to be applied based on the identity or classification. The processor can also instruct the sensors 41 to measure characteristics of the object undergoing supercooling and in turn, receive the measured values as feedback for determining if new parameters of the field are needed and if so, values of the parameters. Based on the feedback from the sensors, the processor can communicate the new parameter values for the magnets and electrodes, to change the field applied to the object for changing the supercooling conditions.

In a further embodiment, the processor can obtain data from the sensors, electrodes, and magnets for providing, via a wireless transceiver included in the device, to a cloud-based server for determining an identity or classification of the object, determining initial parameters for the field, and identifying new field parameters for adjusting the field. When performed in the cloud, the data set of object identities and classifications, initial values for the field parameters, and guidelines for adjusted parameters can be utilized by users of different devices. In contrast, when the processor of the supercooling device performs such actions, the data sets are specific to that supercooling device.

Figure 3:
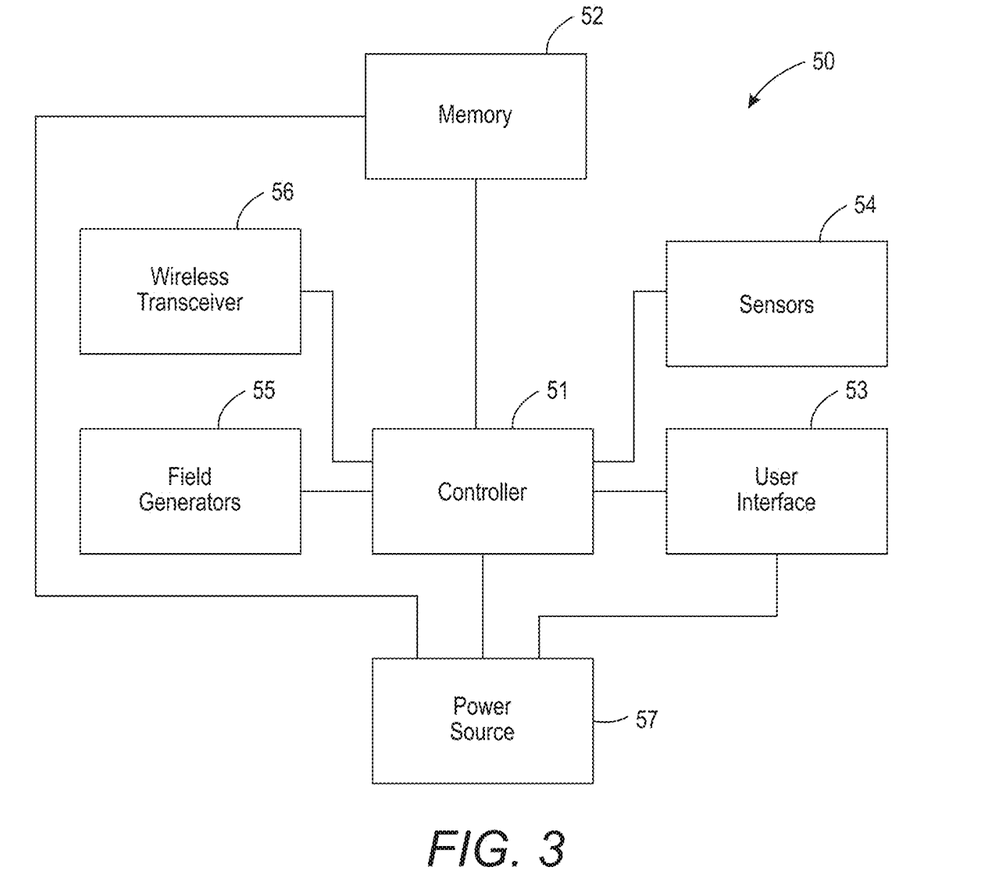
FIG. 3 is a functional block diagram showing, by way of example, the component architecture of the device of FIG. 2.

Together, the components of the feedback device work together to control nucleation and specifically, prevent nucleation when the object is exposed to freezing conditions. FIG. 3 is a functional block diagram showing, by way of example, the component architecture 51 of the device of FIG. 2. The components are powered through a power source 57, such as a battery, including a rechargeable battery, or an AC power source, such as a connection to a socket. Operation of the components is managed by a controller 51, such as a processor, which is connected to a wireless transceiver 56, field generators 55 (including array 49 and electrodes 43a,b), sensors 54, and a user interface 53. An identity of an object can be determined automatically via the sensors 54 or provided via a user through a user interface 53. Alternatively, the identity of the object can be determined external to the feedback device by providing data obtained via the sensors 54 or the user interface to the wireless transceiver 56 for delivery to a cloud server or remote server.

Based on the identity of the object, initial values for field parameters can be determined by the controller 51 or by a remote or cloud server. Subsequently, the field generators 55 emit a field using the field parameter values and the sensors, while the sensors 54 monitor characteristics of the object to which the fields are applied. The controller 51 is also connected to memory 52, which can store data obtained via the sensors or user interface, as well as received by the wireless transceiver. The controller 51 can use the data from the sensors to determine whether the field parameters need to be changed to prevent nucleation, and if so, the values for the new parameters. Alternatively, the data from the sensors is provided to an external server or cloud server via the wireless transceiver 56 for determining new field parameters, if necessary.

The components of the feedback device can vary in size depending on the objects to be supercooled. For large objects, the tray can be larger, as well as the magnets, while the electrodes may be placed further apart from one another due to the larger size of the objects or more electrodes may be used than for smaller objects. Further, a housing of the feedback device can also be dependent on the size of the components and the object.

Figure 4:
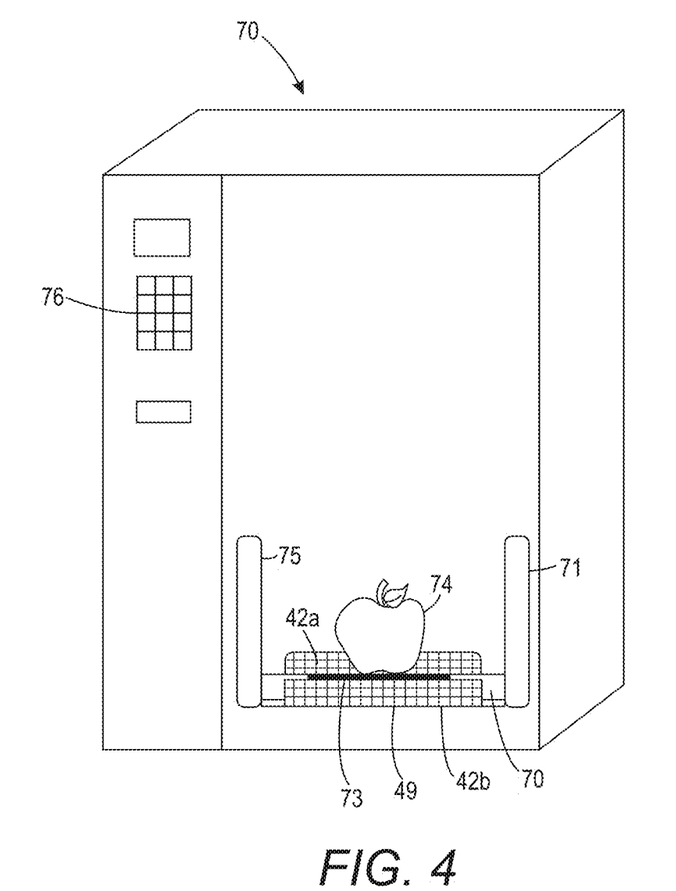
FIG. 4 is a block diagram showing, by way of example, the device of FIG. 2 in a housing.

The components of the device can be included in different types of housing, including standalone housing or housing for other devices, such as microwaves or refrigerators. FIG. 4 is a block diagram showing, by way of example, the device of FIG. 2 in a housing 60. The housing can include, at a minimum, four side walls surrounding the tray. In further embodiment, such as in FIG. 4, a bottom side and a top side can be included, such that the bottom and top sides are opposite one another and surrounded by the four sides to generate an enclosure. One side can include a door through which a tray 70 and object 74 can be introduced into the housing. Other configurations of the housing are possible, including having only a top or bottom side attached to the four side walls, or having a different shape, such as a cylinder, dome, or others.

A key pad and screen 76, or other type of user interface can be affixed on one of the side walls of the housing to receive user input. For example, the user can enter the name of the object for use in determining initial values for field parameters, as well as characteristics of the object. Alternatively, the user can select an identity of the object or provide characteristics of the object via a computer application that communicates with the feedback device.

Field generators, such as phase array elements 42a,b making up the array 49 can be positioned adjacent to the tray 70, while electrodes 73 can be positioned within or on an interior, bottom surface of the tray 70. Alternatively, the electrodes can be positioned adjacent to the tray, such as on the sides of the housing or sides of the tray 70. The field generators apply a field to the object based on the initial parameter values and adjusted parameter values.

Feedback sensors 71 can be positioned in the housing with respect to the tray and the object in the tray to obtain data regarding the object. For example, one or more sensors 71 can be located within the tray or can be affixed to an interior of the housing, including on the four side walls, top wall or bottom wall. An electrical control unit or processor 75 can be affixed to an interior or an exterior of the housing 70. Specifically, the processor can be affixed to one of the side walls, the top side, or the bottom side, and collect the data from the sensors for analysis or for providing to a server for analysis.

In addition to the feedback device components, the housing can also include a compressor for cooling the object to a temperature between a range of −1° C. to −20° C. should preservation of the object be desired. The fields applied by the field generators initiate movement of water molecules in the object to prevent nucleation, while the object itself reaches temperatures below freezing.

If cooling is not desired, the feedback system can be used to create movement of the water molecules in the object to promote growth, as described in in commonly-assigned U.S. patent application, entitled "System and Method for Controlling Cell Functioning and Motility with the Aid of a Digital Computer," Ser. No. 17/876,065, filed Jul. 28, 2022, pending, and preventing the object from adhering to a surface as described in as described in commonly-assigned U.S. patent application, entitled "System and Method for Controlling Cellular Adhesion with the Aid of a Digital Computer," Ser. No. 17/876,072, filed Jul. 28, 2022, pending, the disclosures of which are incorporated by reference.

Figure 5:
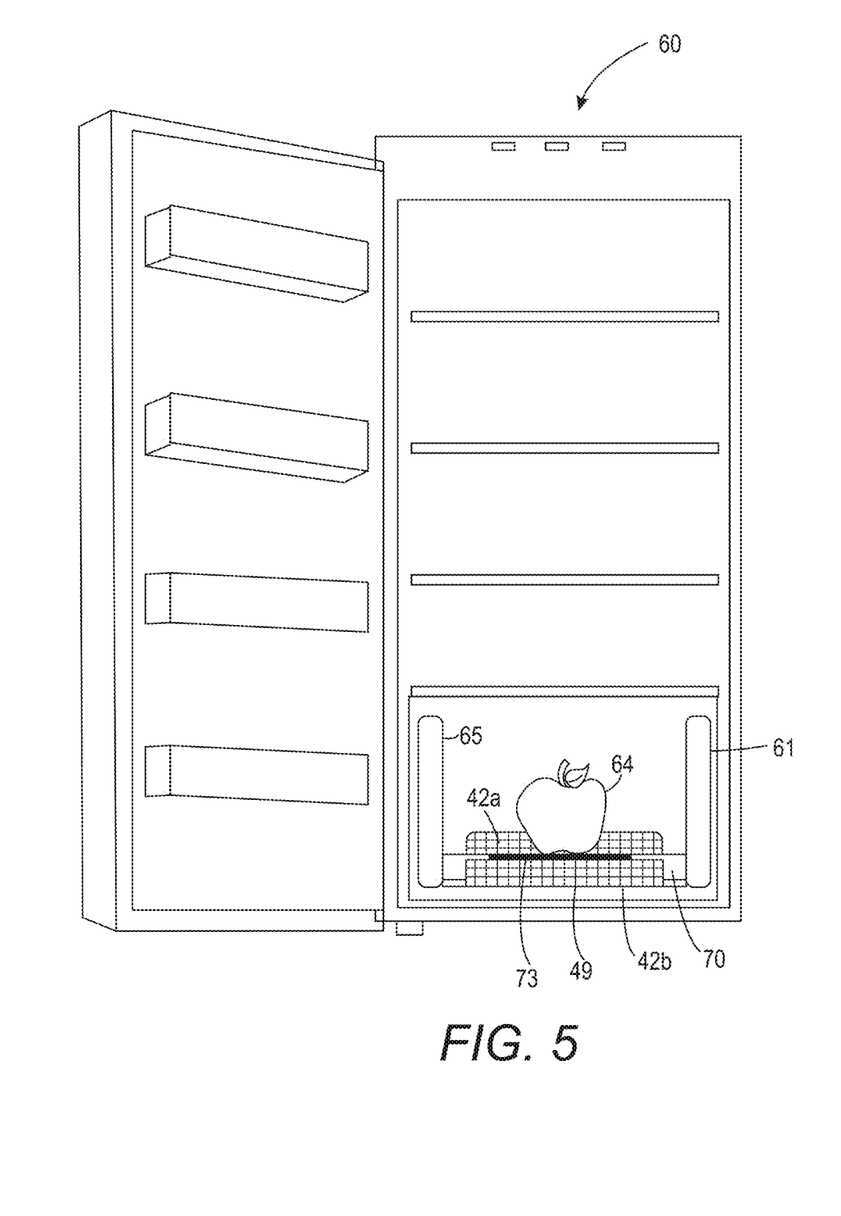
FIG. 5 is a block diagram showing, by way of example, the device of FIG. 2 in a different housing.

The components of the feedback device can also be included in an already existing housing having another function, including a refrigerator, freezer, or microwave. FIG. 5 is a block diagram showing, by way of example, the device of FIG. 2 in a different housing 60. The housing 60 is a refrigerator and the components of the feedback device can be located in a drawer in the refrigerator. The drawer can slide in an out of the refrigerator or a front side of the drawer compartment can open along one side to provide access to an interior of the drawer. Alternatively, the feedback device components can be housed in a compartment in the refrigerator, including at least 3 side walls. A top side and a bottom side can also be included in the compartment.

Within the refrigerator drawer or compartment, a tray 60 can be positioned on a bottom surface of the drawer or compartment. An object 64 is placed within the tray to undergo nucleation control and supercooling, if desired. One or more electrodes 63 can be placed in or within the tray 60, as well as on one or more sides of the drawer or refrigerator compartment. Also, a plurality of array phase elements 42*a,b* making up the array 49 can be placed outside the tray 60 on one or more sides of the drawer or refrigerator compartment.

At least one sensor can be affixed to an exterior of the tray 70 or an interior side of the drawer or compartment to obtain data regarding the object 64 placed within the tray 60. The collected data is utilized by an electrical control unit 65, which can be affixed to the tray 70 or an interior side of the drawer or compartment.

Similar to a standalone housing, the refrigerator, drawer, or compartment can include a key pad via which a user can enter information about the object. Alternatively, the user can access a computer application, such as on a mobile computing device to provide the object information.

Figure 6:
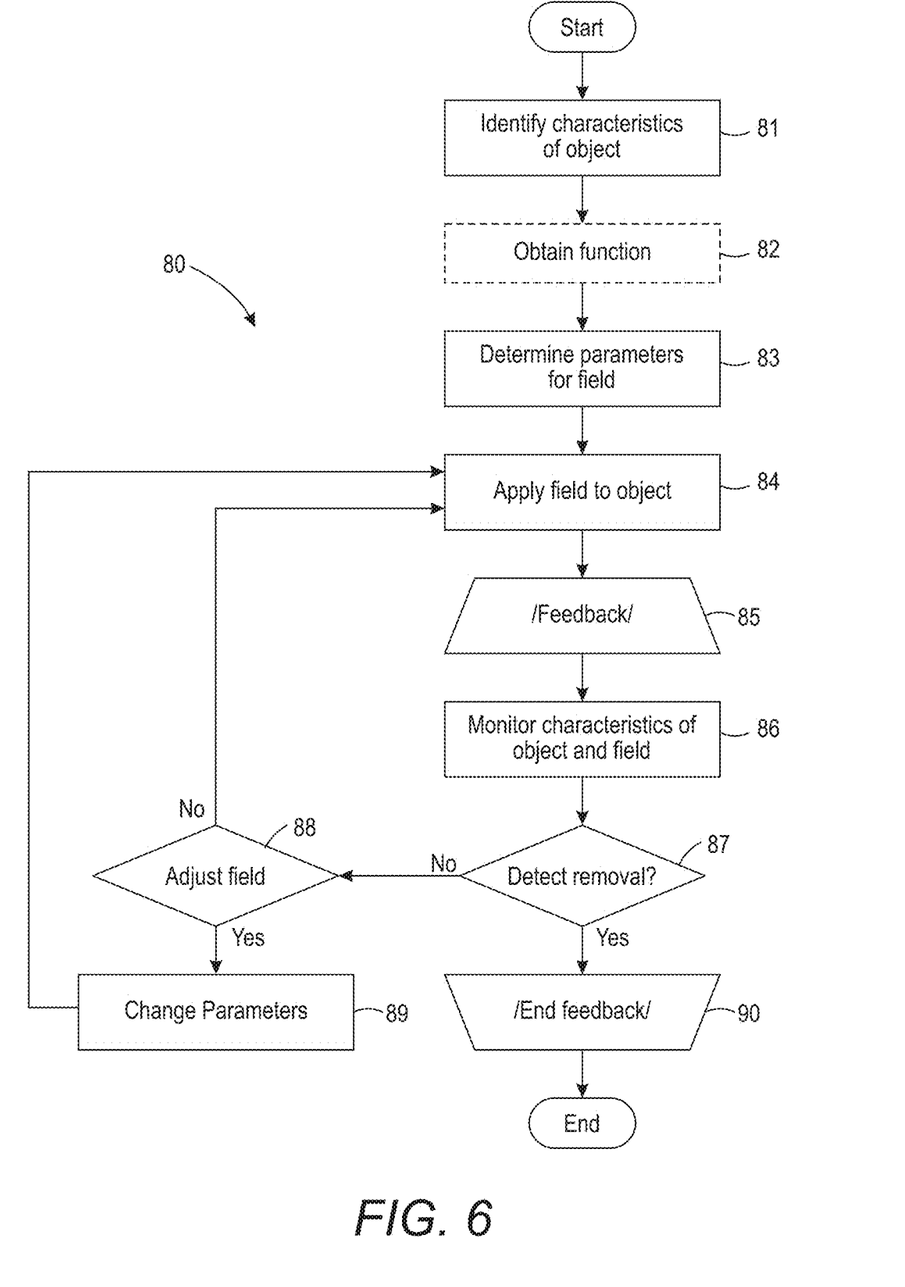
FIG. 6 is a flow diagram showing a method for metamaterial array-based field-shaping in accordance with one embodiment.

The feedback device can control nucleation during supercooling by monitoring the object and adjusting field parameters when nucleation is close or has already begun. FIG. 6 is a flow diagram showing a method 80 for feedback-based supercooling in accordance with one embodiment. The method 80 can be implemented using the system 10 of FIG. 1. At least one object to be supercooled (or otherwise be affected via the application of the field) is placed into a supercooling device. A composition or particular characteristics of the object, including the object's location, can be identified (step 81) via sensors. For example, one or more sensors can send signals towards the object and information about the object is obtained via the signal, which is returned back to the sensor. Passive and active sensors can be used, including imaging and reflective sensors, as well as electro-current sensors, optical sensors, chemical sensors, electrochemical sensors, acoustic sensors, and hyperspectral imaging. Measures for characteristics, such as water content, fat content, density, size, and shape, as well as other characteristics, can be obtained via the sensors. For example, a resistance of a food object can be measured using two electrodes to determine a fat content of the object or hyperspectral imaging can be used to determine a surface roughness or chemical composition of the object. The identified characteristics can be used to classify the object as a type of food or identify the specific food object.

In one embodiment, the identified characteristics can be used to classify the object or determine an identity of the object. A classification can group the object into a category of biological items or food, including grains, meat, seafood, vegetables, dairy or dairy products, fruit, or beverages, including water-based or milk-based beverages, while an identity can include a name of the object, such as an orange, which belongs to the category of fruit. For example, a piece of meat can be distinguished from a vegetable based on having lower water content, more potassium, more saturated fat, and more zinc. The piece of meat can be further identified as pork based on a fat content difference from chicken and beef.

Classification or identification of an object can occur via a camera, using a look up table, be provided by a user, or determined via machine learning. When used, a camera can obtain an image of the object that can be compared with a database of images to determine an identity of the object. The look up table can include characteristics, values for the characteristics, and identities or categories for the object based on the identified characteristics and values. Similarly, location of the object (or objects) within the device can be obtained via a camera (or another optical sensor) or entered by a user.

If user provided, the user can provide the characteristics of the object or an identity of the object by entering the characteristics or identity into the supercooling device or an application for the supercooling device. Alternatively, during machine learning, values for the characteristics are input to classify the object as having a particular identity or belonging to a particular category.

Further, characteristics and classification can differ between different portions of the same object. For example, a composite food item such as a cheeseburger has layers of bread, meat, cheese, and vegetables, as well various toppings, which may require application of different fields to achieve the same effect. Likewise, as described in commonly-assigned U.S. patent application, entitled "System and Method for Controlling Cell Functioning and Motility with the Aid of a Digital Computer," Ser. No. 17/876,065, filed Jul. 28, 2022, pending, the disclosure of which is incorporated by reference, the same field applied to different portions of a living organism such as a plant can have different effects due to different characteristics of those parts. Thus, in addition to overall characteristics, identity, and classification of an object, characteristics (including spatial location within the supercooling device), classification, and identity can be obtained for portions of the object. Likewise, if multiple objects are within the device, the characteristics, identity, and classification would be obtained for each particular object.

Optionally, a function that the device needs to perform is received (step 82). The function can specify the desired effect of the application of the field as described above with reference to FIG. 1. If multiple objects are put into the device at the same time, the function can be specified for each object.

Initial parameters for a field applied during supercooling can be determined (step 83) based on one or more of at least one of the characteristics of the at least one object (including the location of the object) and the identity or classification of the at least one object, if known. Specifically, when an identity of the object is not known, one or more of the characteristics can be used to determine a type of field and initial parameters for the determined field. Even when the identity or classification of the at least one object are known, at least one of the characteristics of the object (location within the supercooling device) can be used to determine the parameters of the field to the object. In addition, if the characteristics and classification of the object are not homogeneous, characteristics (including location), identity and classification for each portion are used to determine the parameters of the field to be applied to each portion of the object using the array of phase array elements described above with reference to FIG. 1. Likewise, if the thickness of the object exceeds a predetermined threshold, separate parameters can be generated to be applied to inner portions of the object and outer portions of the object are generated. Similarly, if multiple objects are put into the device at the same time, the parameters for field (or fields) to be applied to each object are generated. The field can include a magnetic field, electric field, an electromagnetic field, or a combination of fields. Other types of fields are possible.

Meanwhile, the field parameters can include phase, amplitude, frequency, phase, waveform, and duration, as well as other types of parameters. Values for the parameters can be determined using a look up table, which can provide field parameter values for objects based on a characteristic or a combination of characteristics, or based on an identity or classification of the object. In a further embodiment, machine learning can be used to determine the initial field parameters. The learning can be performed based on data sets of the characteristic values and parameters for fields to be applied to each of the different objects.

The generation of the initial parameters further includes determining which sub-motifs in the phase array elements in the array will be used to generate the field (or fields) based on their structure, material they are made of, and their location relative to the object (or portion of the object) to which the field needs to be applied. Further, if a mesh formation is part of the device, generation of the initial parameters determines whether any of the fields would be applied via the mesh and which part of the mesh the fields need to be applied through.

Once the parameters are determined, the field is (or fields are) then applied (step 84) to the object (or objects) based on the values of the parameters.

To maintain supercooling conditions (or progression towards another desired result), such that the object does not begin to freeze while at a below freezing temperature, a feedback system is run (step 85). In one embodiment, desirable supercooling conditions can include a temperature range of object at about −1° C. to −20° C. While undergoing supercooling, the object (or objects) can be monitored (step 85) continuously or at predetermined time periods to determine a condition of the object, or particular portions of the objects. For example, characteristics of the object can be monitored, including temperature, impedance, hyperspectral imaging, acoustic sensing, and visible and infrared imaging. The object can be monitored at different spatial points at different times or at the same time via sensors. Parameters of the applied field can also be monitored (step 86), including wavelength, frequency, phase, amplitude, waveforms, phase, and duration. If at any time, removal of the object (or objects) from the supercooling device is detected (or the application of the field otherwise becomes unnecessary, such as if a desired result is achieved) (step 87), monitoring of the object ends and the feedback system and supercooling process is completed for that object (or objects) (step 90).

However, if the object (or objects) remains in the supercooling device under supercooling conditions, the monitored characteristics of the object and field can be used to determine whether the field needs to be adjusted (step 88). If the object is determined to be under appropriate supercooling conditions, such that the object reaches a temperature between −1° C. and −20° C., and no nucleation of the water molecules in the object has commenced, or if the object is undergoing satisfactory progression towards another desired goal, no adjustments may be necessary and the field is continued (step 84). For example, ultrasonic sensors can be used to identify air pockets within an object and thus, a density of the object. A dense object, like a carrot, has fewer air pockets for water than less dense objects, such as lettuce. If nucleation or freezing is beginning, the density of the carrot can change as the water in the air pockets freeze and expansion between the cells of the carrot occurs. The propagation of sound through ice and water are different as well, thus acoustic sensors can be used to determine the beginning of the formation of ice (if such formation occurs). Further, if the position of the object is changed within the supercooling device or if one of multiple objects within the device is removed (but one or more others still remain), the parameters of the field would likewise be adjusted. For example, a field that was previously applied to a removed object may be discontinued, while a field that was applied to an object that has moved would be redirected towards the object's new location.

If the object (or objects) appears to be close to or actually undergoing nucleation (or deviating from satisfactory progression towards another desired goal), adjustments to the field parameters should be made (step 89). The parameter adjustments can include a change in amplitude, phase, frequency, phase, waveform, wavelength, and duration of the field, which can affect mobility, physical movement or ability of phase-change of water molecules in the object to prevent or reverse nucleation. The field changes can be made manually or automatically, including by changing which of the phase array elements in the array produce the Fourier components necessary for shaping of the field with the desired parameters. In one embodiment different formulas can be used to determine new parameter values based on the monitored characteristics of the object, as well as a graph of object characteristics and calibration of the fields. The chart can include values for the listed characteristics with standard deviations and known progression of time with temperatures for each object with a particular characteristic or combination of characteristics to achieve supercooling. In a different embodiment, machine learning can be used to determine new values for the field parameters.

Returning to the above example, after the carrot is determined to be undergoing nucleation or freezing, the field parameters can be adjusted. New values of the parameters can be determined via machine learning or a graph. For instance, if freezing is occurring, the frequency and wavelength of the field application to the carrot may be increased to result in additional mobility of the water molecules to prevent freezing. After the parameters are changed, the field is applied (step 84) to the object using the adjusted parameters and the feedback process continues (step 85).

While the description above focuses on supercooling certain kinds of items, the device and process described herein can also be applied to various kinds of objects including, raw, preserved or cooked foods, blood, embryos, vaccines, probiotics, medicines, sperm, tissue samples, plant cultivars, cut flowers and other plant materials, biological samples of plants, non-biologicals, such as hydrogel materials, material that can be impacted by water absorption, such as textiles, nylons and plastic lenses and optics, fine instruments and mechanical components, heat exchangers, and fuel, as well as ice as described in commonly-assigned U.S. patent application, entitled "System and Method for Feedback-Based Beverage Supercooling," Ser. No. 17/876,049, filed Jul. 28, 2022, pending; ice as described in commonly-assigned U.S. patent application, entitled "System and Method for Controlling Crystallized Forms of Water," Ser. No. 17/875,939, filed Jul. 28, 2022, pending; organic items as described in commonly-assigned U.S. patent application, entitled "System and Method for Feedback-Based Nucleation Control," Ser. No. 17/876,010, filed Jul. 28, 2022, pending and commonly-assigned U.S. patent application, entitled "Feedback-Based Device for Nucleation Control," Ser. No. 17/875,957, filed Jul. 28, 2022, pending; agriculture as described in commonly-assigned U.S. patent application, entitled "System and Method for Controlling Cell Functioning and Motility with the Aid of a Digital Computer," Ser. No. 17/876,065, filed Jul. 28, 2022, pending; lab grown material, including meat, as described in commonly-assigned U.S. patent application, entitled "System and Method for Controlling Cellular Adhesion with the Aid of a Digital Computer," Ser. No. 17/876,072, filed Jul. 28, 2022, pending; colloids as described in commonly-assigned U.S. patent application, entitled "System and Method for Feedback-Based Colloid Phase Change Control," Ser. No. 17/875,969, filed Jul. 28, 2022, pending, the disclosures of which are incorporated by reference. Further, a receptacle packaging described in commonly-assigned U.S. patent application, entitled "Contact Interfacing Material Receptacle," Ser. No. 17/875,991, filed Jul. 28, 2022, pending, the disclosure of which is incorporated by reference, can be used to hold the objects to which the field is being applied to prevent the object from touching electrode contacts.

While the invention has been particularly shown and described as referenced to the embodiments thereof, those skilled in the art will understand that the foregoing and other changes in form and detail may be made therein without departing from the spirit and scope of the invention.

What is claimed is:

1. A device for metamaterial array-based field-shaping, comprising:
   a compartment sized to hold at least one object;
   an array of phase array elements, each of the phase array elements comprising a metamaterial and configured to generate a plurality of waveform components;
   one or more sensors configured to determine characteristics associated with the object at one or more spatial locations at multiple time points; and
   a controller configured to determine parameters based on the characteristics determined at the multiple time points and to control application of at least one field comprising one or more of the waveform components at the at least one object by at least a portion of the phase array elements based on the parameters by individually controlling at least the portion of the phase array elements generating the one or more waveform components comprised in the field.

2. A device according to claim 1, further comprising at least one mesh formation aligned with a portion of the at least one object.

3. A device accordingly to claim 1, wherein the parameters of the at least one field comprise at least one of phase, frequency, amplitude and strength.

4. A device according to claim 1, wherein each of the phase array elements comprises one or more motifs, each of the motifs comprising at least one sub-motif, and wherein each of the waveform components is generated by the controller individually controlling each of the sub-motifs.

5. A device according to claim 4, the controller further configured to:
   generate parameters for each of the waveforms components based on the parameters of the at least one field and based on a portion of the at least on object to which a waveform formed by that component will be applied;
   individually control the sub-motifs in the at least the portion of the phase array elements to generate the waveform components in accordance with the waveform component parameters.

6. A device according to claim 1, wherein waveform components comprise at least one of phase, frequency, amplitude and strength.

7. A device according to claim 4, wherein at least some of the motifs are three-dimensional.

8. A device according to claim 1, wherein each feedback sensor comprises one of an imaging sensor, reflective sensor, electrocurrent sensor, chemical sensor, electric sensor, acoustic sensor, optical sensor, electrochemical sensor, thermal sensor, and hyperspectral imaging sensor.

9. A device according to claim 1, wherein the characteristics comprise a location of the object within the compartment.

10. A device according to claim 1, wherein the characteristics comprise a thickness of the object.

11. A system for metamaterial array-based field-shaping, comprising:
    a compartment sized to hold at least one object;
    an array of phase array elements, each of the phase array elements comprising a metamaterial and configured to generate a plurality of waveform components;
    one or more sensors configured to determine characteristics associated with the object at one or more spatial locations at multiple time points;
    a controller configured to determine parameters based on the characteristics determined at the multiple time points; and
    a further controller configured to control application of at least one field comprising one or more of the waveform components at the at least one object by at least a portion of the phase array elements based on the parameters by individually controlling at least the portion of the phase array elements generating the one or more waveform components comprised in the field.

12. A system according to claim 11, further comprising at least one mesh formation aligned with a portion of the at least one object.

13. A system accordingly to claim 11, wherein the parameters of the at least one field comprise at least one of phase, frequency, amplitude and strength.

14. A system according to claim 11, wherein each of the phase array elements comprises one or more motifs, each of the motifs comprising at least one sub-motif, and wherein each of the waveform components is generated by the controller individually controlling each of the sub-motifs.

15. A system according to claim 14, further comprising:
    the controller further configured to generate parameters for each of the waveforms components based on the parameters of the at least one field and based on a portion of the at least on object to which a waveform formed by that component will be applied; and
    the further controller further configured to individually control the sub-motifs in the at least the portion of the phase array elements to generate the waveform components in accordance with the waveform component parameters.

16. A system according to claim 11, wherein waveform components comprise at least one of phase, frequency, amplitude and strength.

17. A system according to claim 14, wherein at least some of the motifs are three-dimensional.

18. A system according to claim 11, wherein each feedback sensor comprises one of an imaging sensor, reflective sensor, electrocurrent sensor, chemical sensor, electric sensor, acoustic sensor, optical sensor, electrochemical sensor, thermal sensor, and hyperspectral imaging sensor.

19. A system according to claim 11, wherein the characteristics comprise a location of the object within the compartment.

20. A system according to claim 11, wherein the characteristics comprise a thickness of the object.

* * * * *